(12) United States Patent
Rajagopal (10) Patent No.: US 9,098,917 B2
(45) Date of Patent: Aug. 4, 2015

(54) METHOD AND SYSTEM FOR ACCELERATING COLLISION RESOLUTION ON A RECONFIGURABLE PROCESSOR

(71) Applicant: SAMSUNG ELECTRONICS CO., LTD., Suwon-si (KR)

(72) Inventor: Vasanthakumar Rajagopal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 13/916,884

(22) Filed: Jun. 13, 2013

(65) Prior Publication Data

US 2014/0022267 A1    Jan. 23, 2014

(30) Foreign Application Priority Data

Jul. 19, 2012   (IN) ............................ 2940/CHE/2012
Apr. 3, 2013    (KR) ........................ 10-2013-0036484

(51) Int. Cl.
    *G06T 1/20*    (2006.01)
(52) U.S. Cl.
    CPC ............... *G06T 1/20* (2013.01); *G06T 2210/21* (2013.01)
(58) Field of Classification Search
    CPC ........................................................ G06T 1/20
    See application file for complete search history.

(56) References Cited

U.S. PATENT DOCUMENTS

2006/0149516 A1*   7/2006   Bond et al. ................... 703/6
2009/0070552 A1    3/2009   Kanstein et al.
2010/0164949 A1*   7/2010   Min et al. ................... 345/419
2010/0329162 A1    12/2010  Kadous et al.
2012/0147016 A1*   6/2012   Ishikawa et al. ............. 345/505

FOREIGN PATENT DOCUMENTS

KR    10-2007-0061248    6/2007
KR    10-2011-0069259    6/2011

OTHER PUBLICATIONS

T. Yeh, G. Reinman, S. Patel, and P. Faloutsos, "Fool me twice: Exploring and exploiting error tolerance in physicsbased animation," ACM Trans. Graph., vol. 29, No. 1, p. Article 5, Dec. 2009.*

* cited by examiner

*Primary Examiner* — Kee M Tung
*Assistant Examiner* — Grace Q Li
(74) *Attorney, Agent, or Firm* — NSIP Law (57) ABSTRACT

A method and system for accelerating collision resolution of 3D physics engine on a reconfigurable processor allows the collision resolution module to utilize the immense parallelism available in Coarse Grained Array (CGA) of reconfigurable processor based on ADRES. The method of rescheduling and dividing the collision pairs is performed for accelerating the collision resolution. The method obtains the colliding pairs in the original order of processing from the objects that are under simulation. Then the method starts reordering the collision pairs for removing the dependency between the successive collision pairs. The independent collision pairs obtained from the original colliding pairs are grouped together. The dependent collision pairs are extracted and grouped together. The independent collision pairs are processed in CGA mode by utilizing the loop level parallelism, whereas the dependent collision pairs are processed in VLIW mode.

10 Claims, 8 Drawing Sheets

⎯⎯⎯▶ INDEPENDENT COLLISION PAIRS
◀------- DEPENDENT COLLISION PAIRS

METHOD AND SYSTEM FOR ACCELERATING COLLISION RESOLUTION ON A RECONFIGURABLE PROCESSOR

CROSS-REFERENCE TO RELATED APPLICATIONS

This application claims the priority benefit under 35 USC §119(a) of Indian Patent Application No. 2940/CHE/2012, filed on Jul. 19, 2012, and Indian Patent Application No. 2940/CHE/2012, filed on Feb. 14, 2013, in the Intellectual Property India, and Korean Patent Application No. 10-2013-0036484, filed on Apr. 3, 2013, in the Korean Intellectual Property Office, the disclosures of which are incorporated herein by reference for all purposes.

BACKGROUND

1. Field

The following description relates to a physics simulation, and more particularly, relates to a method and system for accelerating the collision resolution on a reconfigurable processor.

2. Description of the Related Art

Physics simulations are used in a variety of computer graphics applications where virtual objects interact with one another in realistic fashion. For example, in video games, it is desirable to use a physics simulation pipeline to show how the objects in the game interact. For example, in a car racing game, if two cars come into contact at high speed, a Physics Engine identifies the collision and simulates the result of the collision in a realistic way.

Presently, computer and console gaming continue to gain in popularity as major sources of entertainment. As video games and related applications gained in popularity, it is not surprising that new technologies have arisen to provide added realism. In particular, the ability to model game play dynamics using relationships based upon Newtonian mechanics is now the norm.

A physics engine represents a graphics middleware component used to simulate interactions between objects in a manner depicting real world dynamics. In the present scenario, physics processing is done in central processing units (CPUs) or in Graphics Processing Units (GPUs). The Architecture for Dynamically Reconfigurable Embedded Systems (ADRES) design contains a tightly coupled very long instruction word (VLIW) processor and Coarse Grained Reconfigurable Array (CGRA/CGA). They are designed to exploit multiple levels of parallelism, namely instruction level parallelism (ILP) and loop level parallelism (LLP), respectively.

CPUs may have limited scope to utilize the massive parallelism that exists in physics. Graphical processing units can exploit the parallelism, but consume more power. The reconfigurable processors provide a low power alternative for running data intensive applications.

The Coarse Grained Array (CGA) in the architecture can provide a gain of an order equal to the number of computational units in the array. A reconfigurable processor can be used to parallelize the computational loops in physics modules. In particular, the constraints solver or collision resolver module in physics is an iterative algorithm that can be mapped for CGA mode operation.

The collisions are represented as linear complementary problems (LCPs) and are solved iteratively using steepest descent methods. But, the dependency between successive collision pairs prevents the possibility of CGA mapping. Rescheduling the order of processing the collision pairs is one way to remove the dependency. Although few rescheduling methods are available, they target either multi-threaded processing architectures or multi-core GPUs.

SUMMARY

The foregoing and/or other aspects may be achieved by providing a method for accelerating collision resolution on a Reconfigurable Processor (RP), wherein the method includes rescheduling colliding pairs from objects for removing dependency among the collision pairs. The method divides the colliding pairs for processing in at least one of Coarse Grained Array (CGA) mode and Very Long Instruction Word (VLIW) mode.

The foregoing and/or other aspects may be achieved by providing a system for accelerating collision resolution on a Reconfigurable Processor (RP), wherein the system includes a device, and a reconfigurable processor (RP), along with an integrated circuit. The integrated circuit includes at least one processor, and at least one memory. The memory includes a computer program code within the circuit. At least one memory and the computer program code with at least one processor cause the system to reschedule colliding pairs from objects for removing dependency among the colliding pairs. The system is configured to divide the colliding pairs for processing in at least one of Coarse Grained Array (CGA) mode and Very Long Instruction Word (VLIW) mode.

The foregoing and/or other aspects may be achieved by providing a computer program product for accelerating collision resolution on a Reconfigurable Processor (RP), wherein the product includes an integrated circuit. The integrated circuit includes at least one processor, an at least one memory. The memory includes a computer program code within the circuit. At least one memory and the computer program code with at least one processor cause the product to reschedule colliding pairs from objects for removing dependency among the colliding pairs. The product is configured to divide the colliding pairs for processing in at least one of: Coarse Grained Array (CGA) mode, Very Long Instruction Word (VLIW) mode.

The foregoing and/or other aspects may be achieved by providing a method for collision resolution on a Reconfigurable Processor (RP) that supports a Coarse Grained Array (CGA) mode and a Very Long Instruction Word (VLIW) mode, wherein the method comprises obtaining original colliding pairs in the original order of processing from objects that are under simulation, extracting dependent collision pairs from the original colliding pairs, and grouping the extracted dependent collision pairs into a second cluster, selecting independent collision pairs from the original colliding pairs, and grouping the selected independent collision pairs into a first cluster, and processing the independent collision pairs of the first cluster in the CGA mode, and processing the dependent collision pairs of the second cluster in the VLIW mode. The method may further comprise reordering successive collision pairs for removing dependency between the successive collision pairs among the original colliding pairs. Here, at least three successive collision pairs may be independent in the first cluster.

The foregoing and/or other aspects may be achieved by providing a system for accelerating collision resolution in a Reconfigurable Processor (RP), wherein the system comprises at least one processing unit comprising a central processing unit (CPU) and the RP, wherein the RP supports a Coarse Grained Array (CGA) mode and a Very Long Instruction Word (VLIW) mode, and at least one memory. The system may be configured to obtain original colliding pairs in the original order of processing from objects that are under simulation, extract dependent collision pairs from the original colliding pairs, and group the extracted dependent collision pairs into a second cluster, select independent collision pairs from the original colliding pairs, and group the selected independent collision pairs into a first cluster, and process the independent collision pairs of the first cluster in the CGA mode, and process the dependent collision pairs of the second cluster in the VLIW mode.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. Embodiments are described below to explain the present disclosure by referring to the figures.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a method and system for accelerating collision resolution of three dimensional (3D) physics engine on a reconfigurable processor. The method of rescheduling and dividing the collision pairs is performed for accelerating the collision resolution.

Architecture for dynamically reconfigurable embedded systems (ADRES) is a low power, flexible architecture designed to accelerate multifarious applications such as video processing, graphics, and so on, in hand-held smart devices. The ADRES design includes a tightly coupled Very Long Instruction Word (VLIW) processor and Coarse Grained Reconfigurable Array (CGRA/CGA). The reconfigurable processor is designed based on ADRES. The disclosed method is implemented on the reconfigurable processor. The method accelerates the collision resolution of physics engine on CGRA.

The method obtains the colliding pairs in the original order of processing from the objects that are under simulation. Then, the method starts reordering the collision pairs for removing the dependency between the successive collision pairs. The independent collision pairs obtained from the original colliding pairs are grouped together. The dependent collision pairs from the original colliding pairs are extracted and grouped together. The independent collision pairs are processed in CGA mode by utilizing the loop level parallelism, whereas the dependent collision pairs are processed in VLIW mode.

The method disclosed herein may be implemented in a reconfigurable processor (RP) of a user device.

In an embodiment, the user device may be a mobile phone, tablet, or any other hand held electronic device.

Throughout the description, the terms colliding pairs and collision pairs are used interchangeably.

Referring now to the drawings, and more particularly to FIGS. 1 through 8, where similar reference characters denote corresponding features consistently throughout the figures, there are shown preferred embodiments.

Figure 1:
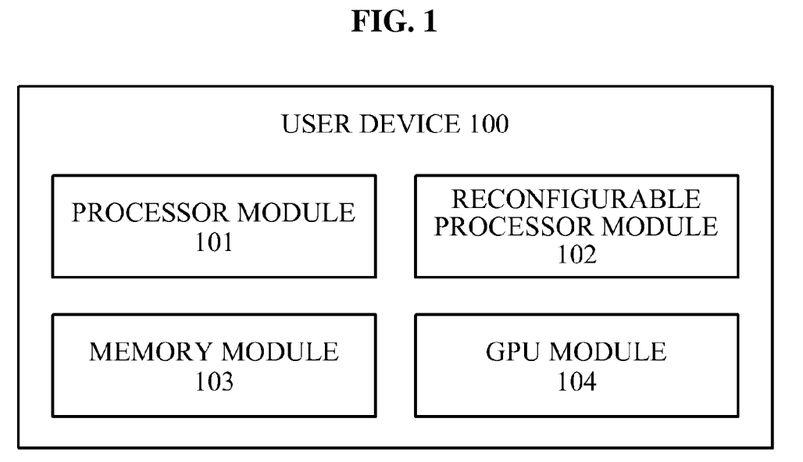
FIG. 1 illustrates a block diagram of a user device, according to embodiments as disclosed herein.

FIG. 1 illustrates a block diagram of a user device, according to embodiments as disclosed herein. As depicted in the figure, the user device 100 includes a processor module 101, a reconfigurable processor module 102, a memory module 103, and a graphics processing unit (GPU) module 104.

The processor module 101 provides the processing, I/O scanning, logic, control, and communication functions in the user device 100. The Real-time embedded processors have been developed for deeply embedded real-time applications where the need for low power and good interrupt behavior are balanced with exceptional performance and strong compatibility with existing platforms. In an embodiment, the processor module 101 may be an ARM processor.

The reconfigurable processor module 102 may be designed based on ADRES. The reconfigurable processor (RP) in the user device 100 utilizes low power for handling physics.

The memory module 103 may include a random access memory (RAM) or another type of dynamic storage device that may store information and instructions, such as an application, for example, for execution by processor, a read-only memory (ROM) device, or another type of static storage device.

The GPU module 104 in the user device 100 includes a GPU. The GPUs are very efficient at manipulating computer graphics and are generally more effective than general-purpose CPUs for algorithms where processing of large blocks of data is done in parallel. Smart phones are equipped with advanced embedded chipsets that may do many different tasks depending on their programming. GPUs are an essential part of those chipsets and as mobile games are pushing the boundaries of their capabilities, the performance of the GPU plays a key role.

Figure 2:
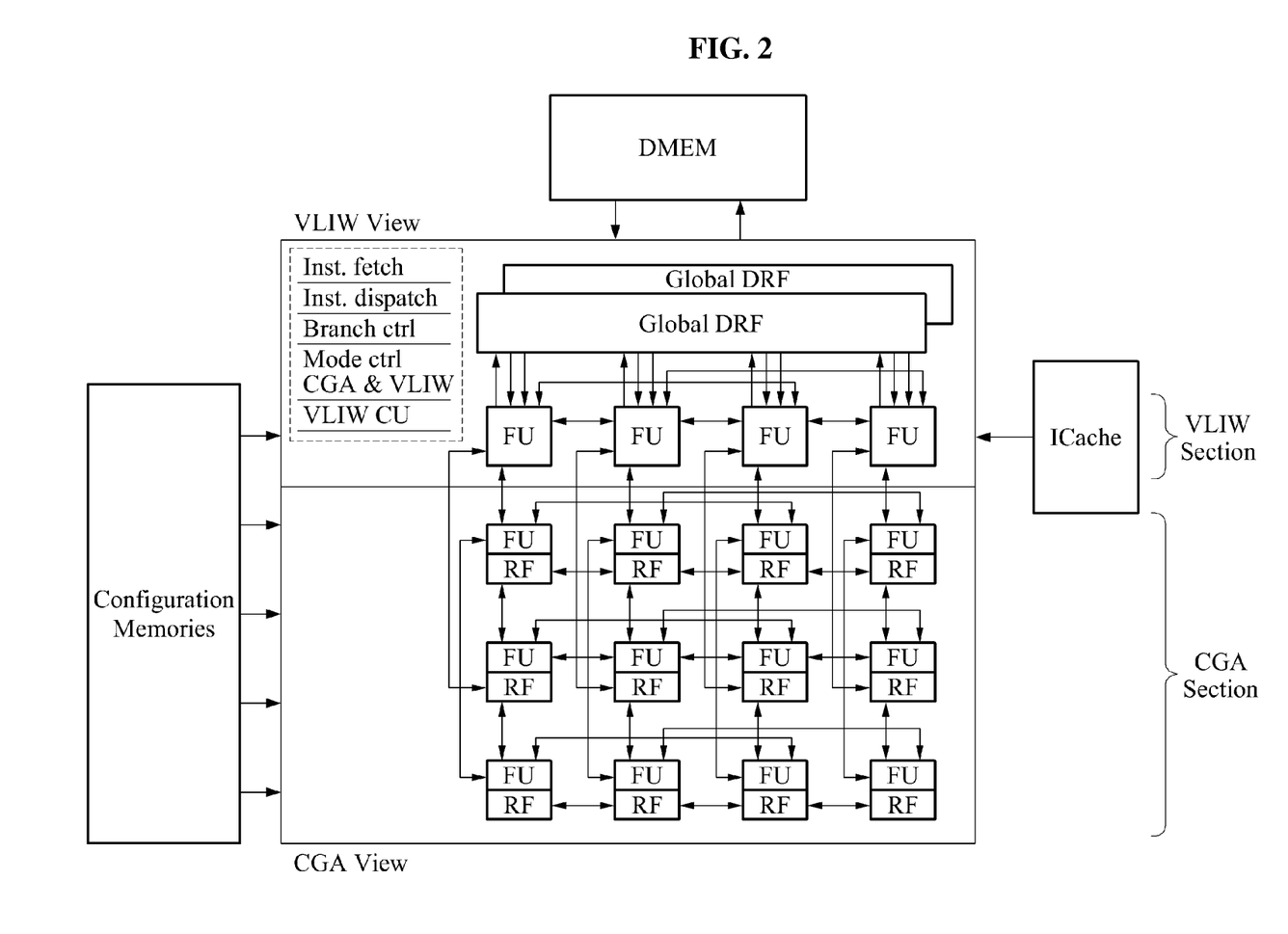
FIG. 2 illustrates an architecture for dynamically reconfigurable embedded systems (ADRES)

FIG. 2 illustrates architecture for dynamically reconfigurable embedded systems (ADRES) in the existing art. The ADRES architecture is a data path-coupled coarse-grained reconfigurable matrix. The ADRES architecture is a power-efficient, flexible architecture template that combines a very long instruction word (VLIW) digital signal processor (DSP) with a 2-D Coarse-Grained heterogeneous reconfigurable Array (CGA).

The VLIW architectures execute multiple instructions per cycle, packed into a single large "instruction word" or "packet", and use simple, regular instruction sets. The VLIW DSP efficiently executes the control-flow code by exploiting instruction-level parallelism (ILP). The coarse grained array, containing many functional units, accelerates data-flow loops by exploiting high degrees of loop-level parallelism (LLP).

The ADRES template thus tightly couples a very-long instruction word (VLIW) processor and a coarse-grained array by providing two functional modes on the same physical resources. It brings advantages such as high performance, low power consumption and ease of programming. An application written in a programming language such as 'C' may be quickly mapped onto an ADRES instance. ADRES is a template rather than a concrete architecture. Architectural exploration becomes possible to discover better architectures or design domain-specific architectures.

The ADRES template includes many basic components, including computational, storage and routing resources. The computational resources are functional units (FUs) that are capable of executing a set of word-level operations selected by a control signal. Data storages such as register files (RFs) and memory blocks may be used to store intermediate data. The routing resources include wires, multiplexers, and busses. An ADRES instance thus includes functional units, register files, and routing resources such as busses and multiplexers, for example, to connect the functional units and the register files.

The computational resources (FUs) and storage resources (example RFs) are connected in a certain topology by the routing resources to form an instance of an ADRES array. The whole ADRES array has two functional modes, namely the VLIW processor and the reconfigurable array. These two functional modes may share physical resources because their executions do not overlap. The processor operates either in VLIW mode or in CGA mode. The global data register files RF are used in both modes and serve as a data interface between the functional units.

When compiling, with a compiler, applications for ADRES architecture, loops are modulo-scheduled for the CGA and the remaining code is compiled for the VLIW. By seamlessly switching the architecture between the VLIW mode and the CGA mode at run-time, statically partitioned and scheduled applications may be run on the ADRES instance with a high number of instructions-per-clock (IPC).

The topology, the connectivity, and the features of the functional units and register files of an ADRES instance are defined at design time with an architecture template. For the multi-threaded ADRES the template is extended to include information about the partitioning and also to guarantee that each partition or combination of partitions is itself a valid ADRES instance. The architecture template defines all aspects of a specific ADRES instance for the compiler.

Figure 3:
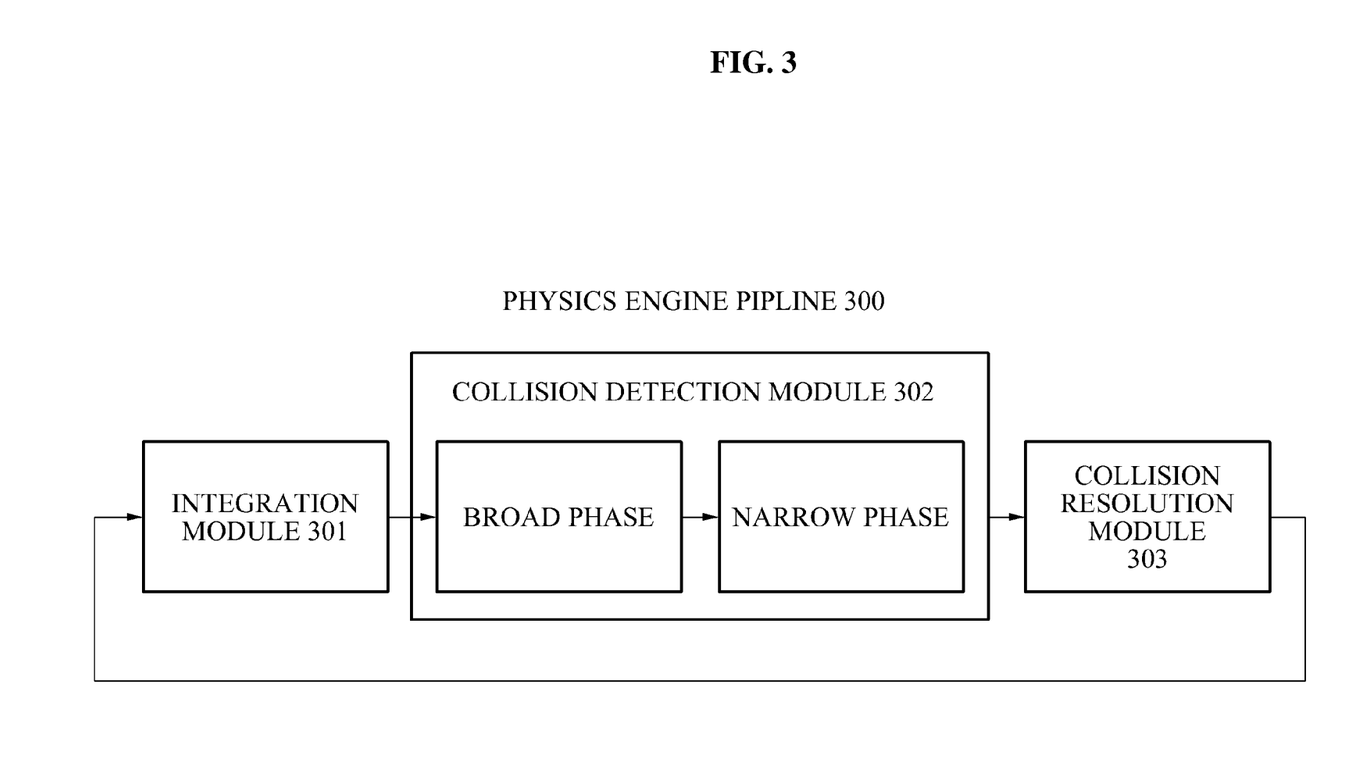
FIG. 3 illustrates the physics engine pipeline.

FIG. 3 illustrates the physics engine pipeline in the existing art. In a physics simulation pipeline, there is a geometrical phase that includes a parallel collision detection pipeline. A parallel collision detection pipeline obtains the information at positions, rotations, and velocities of body geometries, and produces a set of contact points. Joints between bodies are created for some or all contact points. This set of joints is used in force computation and physical simulation stages to develop virtual forces applied to bodies and to simulate correct body movement in response to those forces.

As depicted in the figure, the physics engine pipeline 300 includes an integration module 301, a collision detection module 302, and a collision resolution module 303. The integration module 301 updates the position and orientation of objects in games using external forces in the simulation.

Collision detection is a phase of a physics simulation pipeline responsible for detecting contact points between objects in a modeled scene. Each object in the scene is represented by physical characteristics such as shape, size, mass, and position, for example.

The collision detection module 302 includes a broad phase and a narrow phase, as shown in the figure. The broad phase detects pairs of objects with possible contacts between them in the scene of interest. Each of these pairs of objects goes to a narrow phase for exact contact detection. The aim of the broad phase is to reduce the number of pairs of objects for narrow phase analysis.

The collision detection module 302 identifies the object pairs that are colliding. The output of the collision detection module 302 is the contact points between the objects in the object pair. Each contact point is defined by its three-dimensional coordinates in the scene and by pointers to two associated contacting objects. A contact point contains some additional information that helps to accurately perform collision resolution as shown in the module 303.

The collision resolution module 303 calculates velocities of objects as a result of collision. Joint constraints are also resolved. A Joint represents a constraint between two objects where movement of one object is limited by the other. An example is hinge joint in doors.

Figure 4:
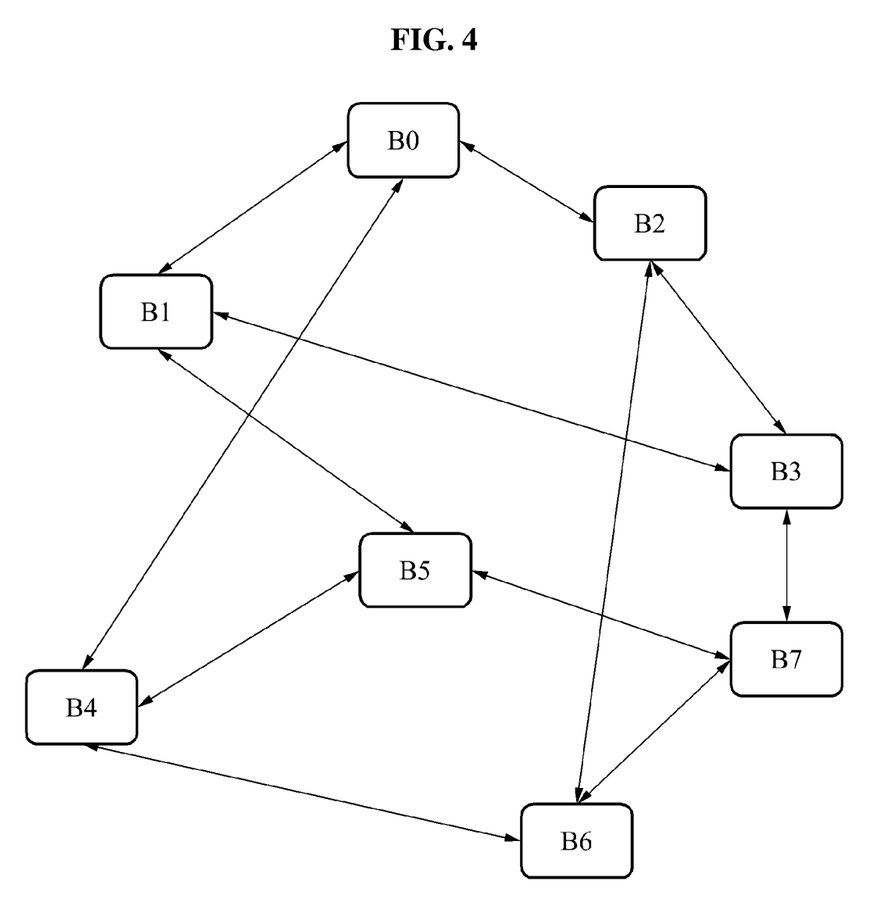
FIG. 4 illustrates an exemplary collision pairs, according to the embodiments as disclosed herein.

FIG. 4 illustrates exemplary collision pairs, according to the embodiments as disclosed herein. As depicted in the figure, the objects B0 to B7 are under simulation. The link between two objects in the figure represents that the two objects are colliding and the collision needs to be solved using the collision resolution module 303.

Figure 5:
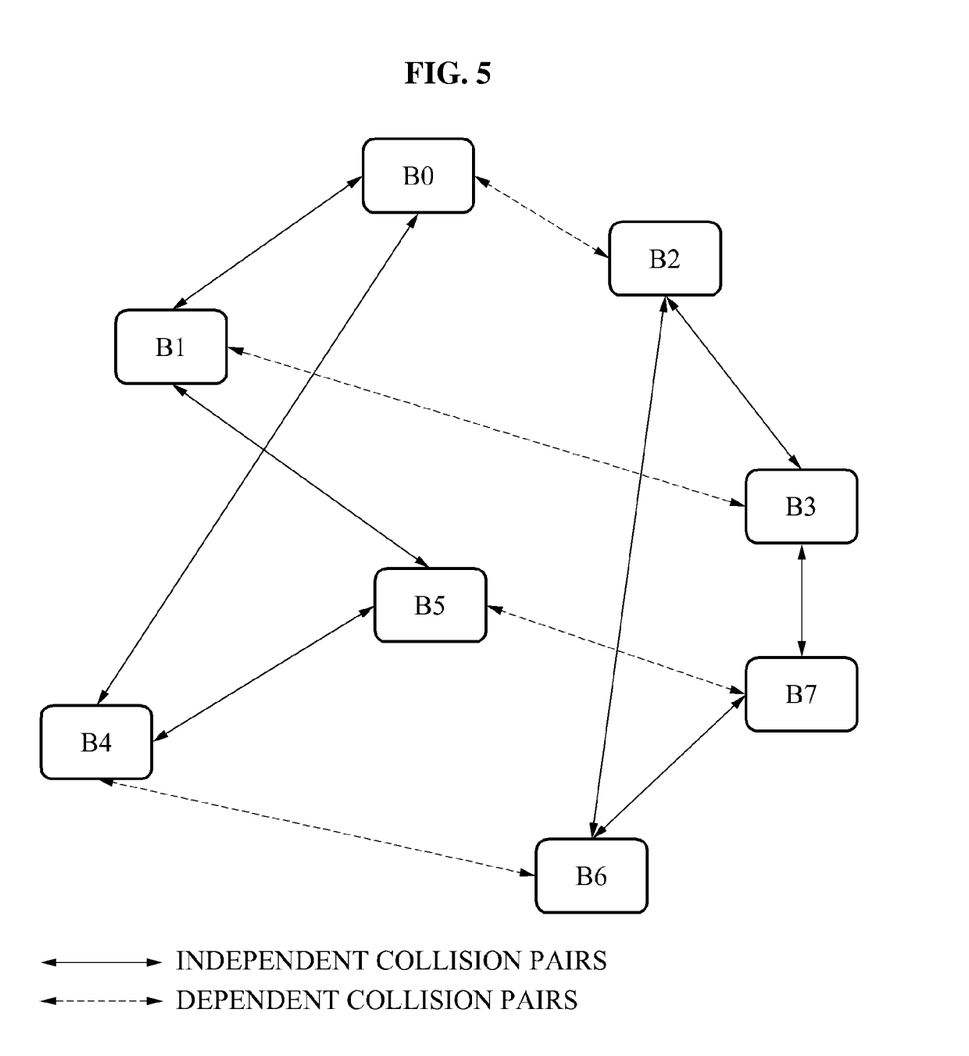
FIG. 5 illustrates the collision pairs after rescheduling and dividing, according to the embodiments as disclosed herein.

FIG. 5 illustrates the collision pairs after rescheduling and dividing, according to the embodiments as disclosed herein. Initially, the method starts with reordering the collision pairs for removing the dependency between the successive collision pairs. The collision pairs are divided into two clusters or groups. The collision pairs that are rescheduled according to the independence criteria are kept in the first cluster, or group. The remaining collision pairs are grouped in the second cluster, or group.

The normal arrows shown in the figure are rescheduled for processing on the reconfigurable processor, by removing the dependency. Those objects connected by normal arrows form the first cluster, which may be mapped on Coarse-Grained Array (CGA). The objects that are connected by arrows with dotted lines form a second cluster for execution in very long instruction (VLIW) mode. Since the first cluster has independent collision pairs, those objects present in the first cluster may be processed in CGA mode by utilizing the loop level parallelism.

Figure 6:
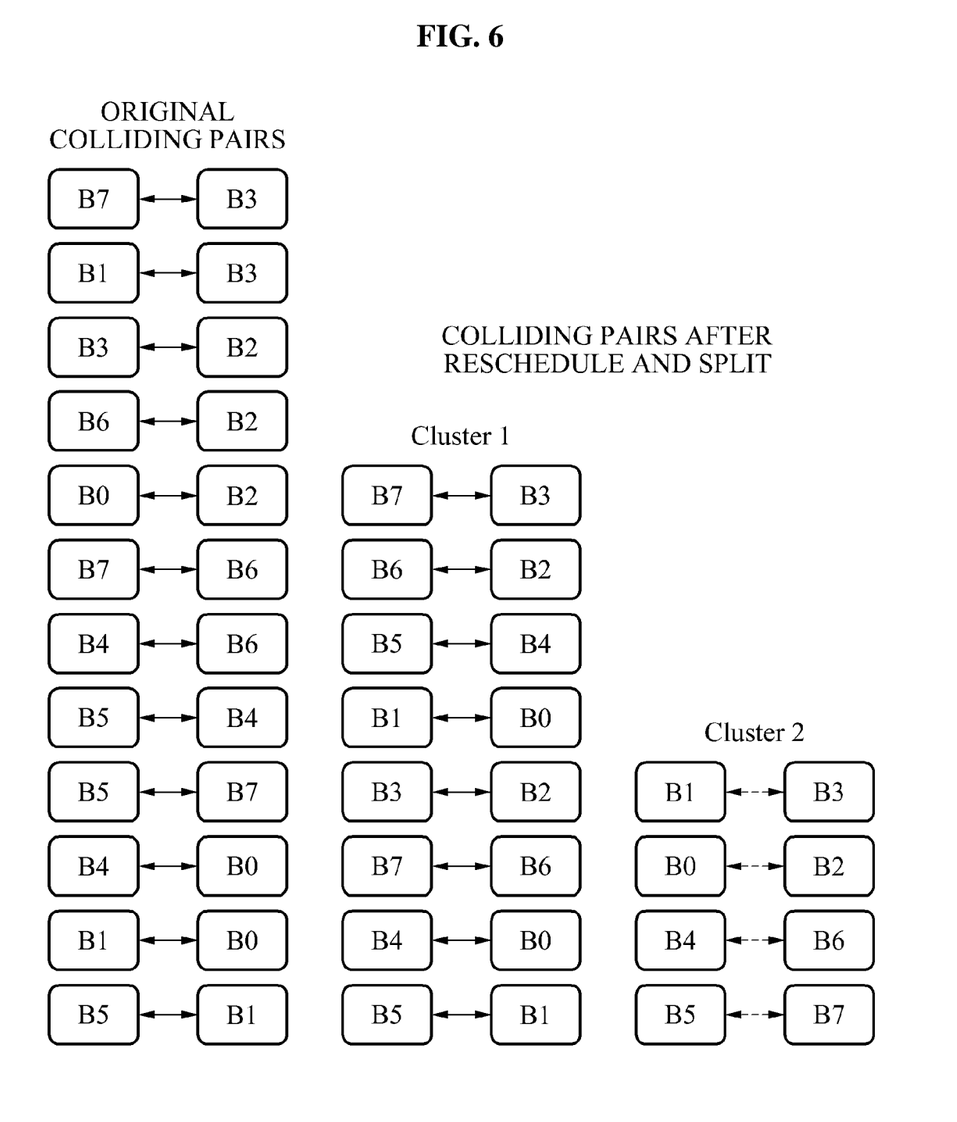
FIG. 6 illustrates the processing order of collision pairs by the reconfigurable processor, according to the embodiments as disclosed herein.

FIG. 6 illustrates the processing order of collision pairs by the reconfigurable processor, according to the embodiments as disclosed herein. Initially, the method obtains the colliding pairs in the original order of processing from the objects that are under simulation. The original colliding pairs that are obtained from FIG. 4 are shown in the first column. Then the method starts with reordering the collision pairs for removing the dependency between the successive collision pairs. The independent collision pairs obtained from the original colliding pairs are grouped together and named as cluster 1, as shown in the figure. The dependent collision pairs from the original colliding pairs are extracted and grouped together with a name as cluster 2, as shown in the figure. The cluster 1 is processed in CGA mode by utilizing the loop level parallelism, whereas the cluster 2 is processed in VLIW mode.

As depicted in the figure, the second colliding pair (B1-B3), shown in the original colliding pairs, has the common object (B3), which also exists in the first colliding pair. Hence, the second colliding pair that is dependent on the first colliding pair is removed and grouped in cluster 2. In this way, all the colliding pairs are either re-ordered in cluster 1 or removed from cluster 1 and added to cluster 2 as shown in the figure. All the independent colliding pairs that are forming cluster 1 are processed in CGA mode and all the dependent colliding pairs that are grouped in cluster 2 are processed in VLIW mode.

In an embodiment, the colliding pairs in cluster 2 may have dependent colliding pairs. Even though the dependent colliding pairs for cluster 2 is not shown in the figure, the dependent collision pairs may exist in cluster 2 and these collision pairs are processed in the RP in VLIW mode.

It was observed that at least three successive colliding pairs have to be independent for proper CGA mapping. Hence, for accelerating collision resolution, method reschedules at least three successive collision pairs that are independent to each other, or in other words, there exists no object in common for at least three successive collision pairs (which are independent to each other) that are grouped in cluster 1.

The method reschedules the colliding pairs in such a way that a majority of colliding pairs (that are independent to each other) are grouped together in cluster 1 for processing in CGA mode.

Figure 7:
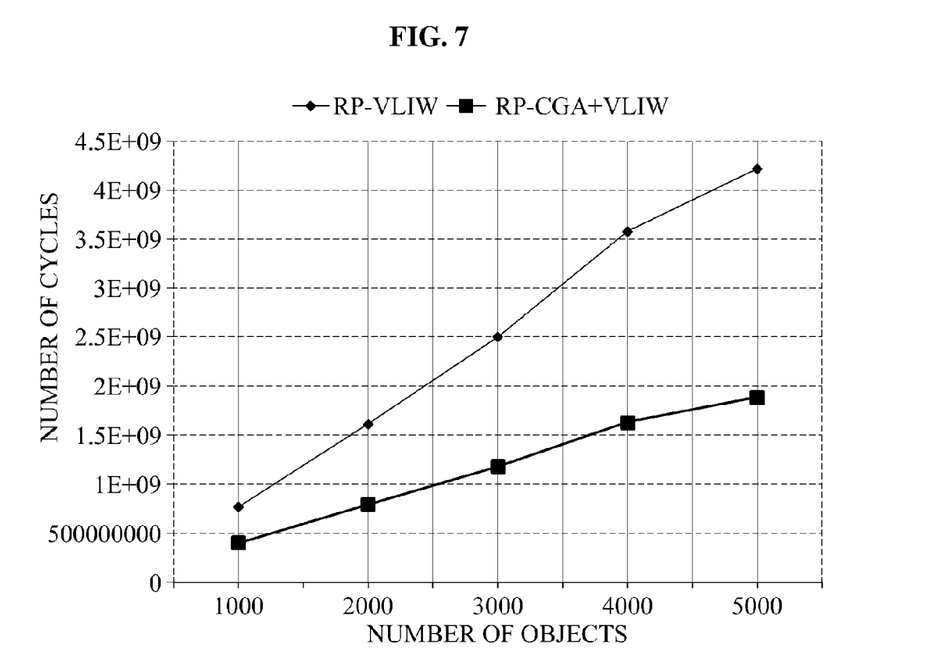
FIG. 7 is a simulation graph that shows the performance improvement using the rescheduling method, according to the embodiments disclosed herein.

FIG. 7 is a simulation graph that shows the performance improvement using the rescheduling method, according to the embodiments disclosed herein. The graph provides the performance curves for the collision resolution module 303 in a reconfigurable processor (RP) before and after rescheduling. The graph also provides the performance of the RP, when the RP is configured for running in both CGA and VLIW modes. The performance curves provide the number of cycles (Y-axis) achieved by the RP before and after applying the rescheduling method described above. The number of objects that are colliding is shown on X-axis. The gain of the reconfigurable processor by the using the rescheduling method ranges from 1.9 for 1000 objects to 2.22 for 5000 objects. The gain increases with an increase in a number of collisions. Due to a greater number of collision pairs, a greater number of independent collision pairs is grouped and may be processed in CGA mode.

Figure 8:
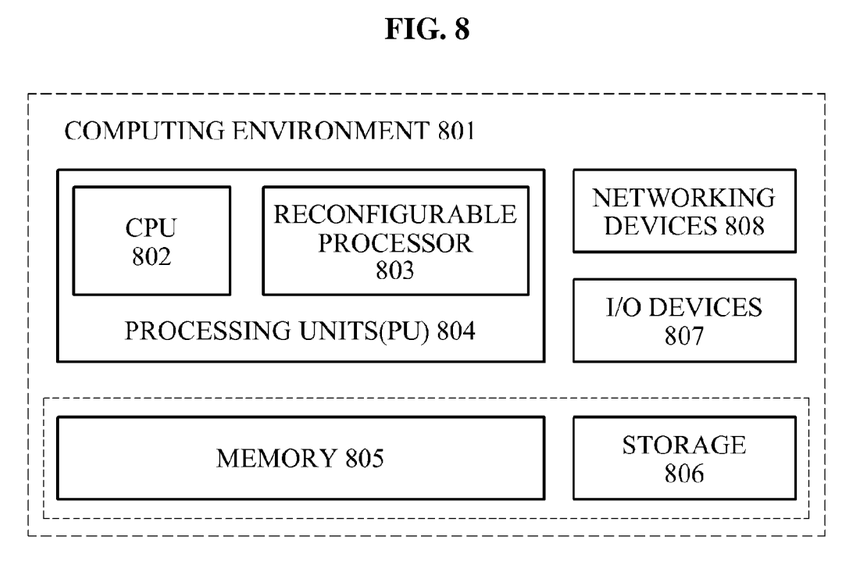
FIG. 8 illustrates a computing environment implementing the method and system for accelerating the collision resolution on a reconfigurable processor.

FIG. 8 illustrates a computing environment implementing the method and system for accelerating the collision resolution on a reconfigurable processor, according to the embodiments as disclosed herein. As depicted, the computing environment 801 includes at least one processing unit 804 that is equipped with a central processing unit (CPU) 802 and a reconfigurable processor (RP) 803, a memory 805, a storage unit 806, a plurality of networking devices 808, and a plurality of input output (I/O) devices 807. The processing unit 804 is responsible for executing the instructions of the algorithm.

An application runs in the CPU 802 and computationally intensive parts of Physics are offloaded to the Reconfigurable Processor 803.

The overall computing environment 801 may include multiple homogeneous and/or heterogeneous cores, multiple CPUs of different kinds, special media, and other accelerators. The processing unit 804 is responsible for processing the instructions of the algorithm. The plurality of processing units 804 may be located on a single chip or over multiple chips.

The algorithm, including instructions and codes required for the implementation, are stored in either the memory unit 805 or the storage 806, or both. At the time of execution, the instructions may be fetched from the corresponding memory 805 and/or storage 806, and executed by the processing unit 804.

In case of any hardware implementations various networking devices 808 or external I/O devices 807 may be connected to the computing environment to support the implementation through the networking unit and the I/O device unit.

The embodiments disclosed herein may be implemented through at least one software program running on at least one hardware device and performing network management functions to control the elements. The elements shown in FIGS. 1 and 8 include blocks which may be at least one of a hardware device, or a combination of hardware device and software module.

The above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Therefore, while the embodiments herein have been described in terms of preferred embodiments, those skilled in the art will recognize that the embodiments herein may be practiced with modification within the spirit and scope of the embodiments as described herein.

What is claimed is:

1. A apparatus for accelerating collision resolution on a Reconfigurable Processor (RP), An apparatus comprising:
   a processor;
   a reconfigurable processor;
   a memory module; and
   a graphics processing unit,
   wherein the processor reschedules colliding pairs from objects to remove dependency among the colliding pairs; and
   divides the colliding pairs for processing in at least one of a Coarse Grained Array (CGA) mode and a Very Long Instruction Word (VLIW) mode.

2. The apparatus of claim 1, wherein the processor divides the colliding pairs into at least one of an independent cluster and a dependent cluster,
   wherein the dependent cluster comprises a dependent colliding pair.

3. The apparatus of claim 2, wherein the independent cluster is processed in the CGA mode, and
   wherein the dependent cluster is processed in the VLIW mode on the RP.

4. A system for accelerating collision resolution on a Reconfigurable Processor (RP), the system comprising:
   the reconfigurable processor (RP);
   an integrated circuit comprising a processor; and
   a memory module having a computer program code within the circuit,
   wherein the memory module and the computer program code with the processor cause the system to:
   reschedule colliding pairs from objects to remove dependency among the colliding pairs; and
   divide the colliding pairs for processing in at least one of a Coarse Grained Array (CGA) mode and a Very Long Instruction Word (VLIW) mode.

5. The system of claim 4, wherein the system is configured to divide the colliding pairs into at least one of an independent cluster and a dependent cluster,
   wherein the dependent cluster comprises a dependent colliding pair.

6. The system of claim 5, wherein the system is configured to process the independent cluster in the CGA mode, and
   wherein the system is further configured to process the dependent cluster in the VLIW mode.

7. A method for collision resolution on a Reconfigurable Processor (RP) that supports a Coarse Grained Array (CGA) mode and a Very Long Instruction Word (VLIW) mode, the method comprising:
   obtaining original colliding pairs in the original order of processing from objects that are under simulation;
   extracting dependent collision pairs from the original colliding pairs, and grouping the extracted dependent collision pairs into a second cluster;
   selecting independent collision pairs from the original colliding pairs, and grouping the selected independent collision pairs into a first cluster; and
   processing, by a processor, the independent collision pairs of the first cluster in the CGA mode, and processing the dependent collision pairs of the second cluster in the VLIW mode.

8. The method of claim 7, wherein the method further comprises:
   reordering successive collision pairs to remove dependency between the successive collision pairs among the original colliding pairs.

9. The method of claim 7, wherein at least three successive collision pairs are independent in the first cluster.

10. A non-transitory computer-readable recording medium storing a program to implement the method of claim 7.

* * * * *